United States Patent
Nimoda

(10) Patent No.: US 6,614,814 B1
(45) Date of Patent: Sep. 2, 2003

(54) MULTIPLEXED SIGNAL DEMULTIPLEXING DEVICE TRANSMISSION ERROR MEASURING DEVICE AND TRANSMISSION ERROR MEASURING METHOD

(75) Inventor: Hiroshi Nimoda, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 0 days.

(21) Appl. No.: 09/280,061

(22) Filed: Mar. 29, 1999

(30) Foreign Application Priority Data

Mar. 31, 1998 (JP) .......................................... 10-087790

(51) Int. Cl.$^7$ ................................................. H04J 3/04

(52) U.S. Cl. ......................... 370/537; 370/533; 370/535

(58) Field of Search ................................. 370/533, 535, 370/536, 537, 538, 542

(56) References Cited

U.S. PATENT DOCUMENTS 5,271,001 A * 12/1993 Hadano ....................... 370/220
5,524,207 A * 6/1996 Kanoh .......................... 714/42
5,621,758 A * 4/1997 Suzuki et al. ................ 375/238

* cited by examiner

*Primary Examiner*—Hassan Kizou
*Assistant Examiner*—Saba Tsegaye
(74) *Attorney, Agent, or Firm*—Oliff & Berridge, PLC

(57) ABSTRACT

The transmission error measuring device comprises; a first counting circuit, a test data outputting circuit, a selecting circuit, a multiplexing circuit, a demultiplexing circuit, an arranging circuit, a data array monitoring circuit, a second counting circuit, a reference data outputting circuit, and a comparing circuit. When a test data outputted from the test data outputting circuit does not correspond to a reference data outputted from the reference data outputting circuit, the data array monitoring circuit rearranges the first count value by using a bit set at the bottom thereof in order to rearrange the test data.

8 Claims, 9 Drawing Sheets

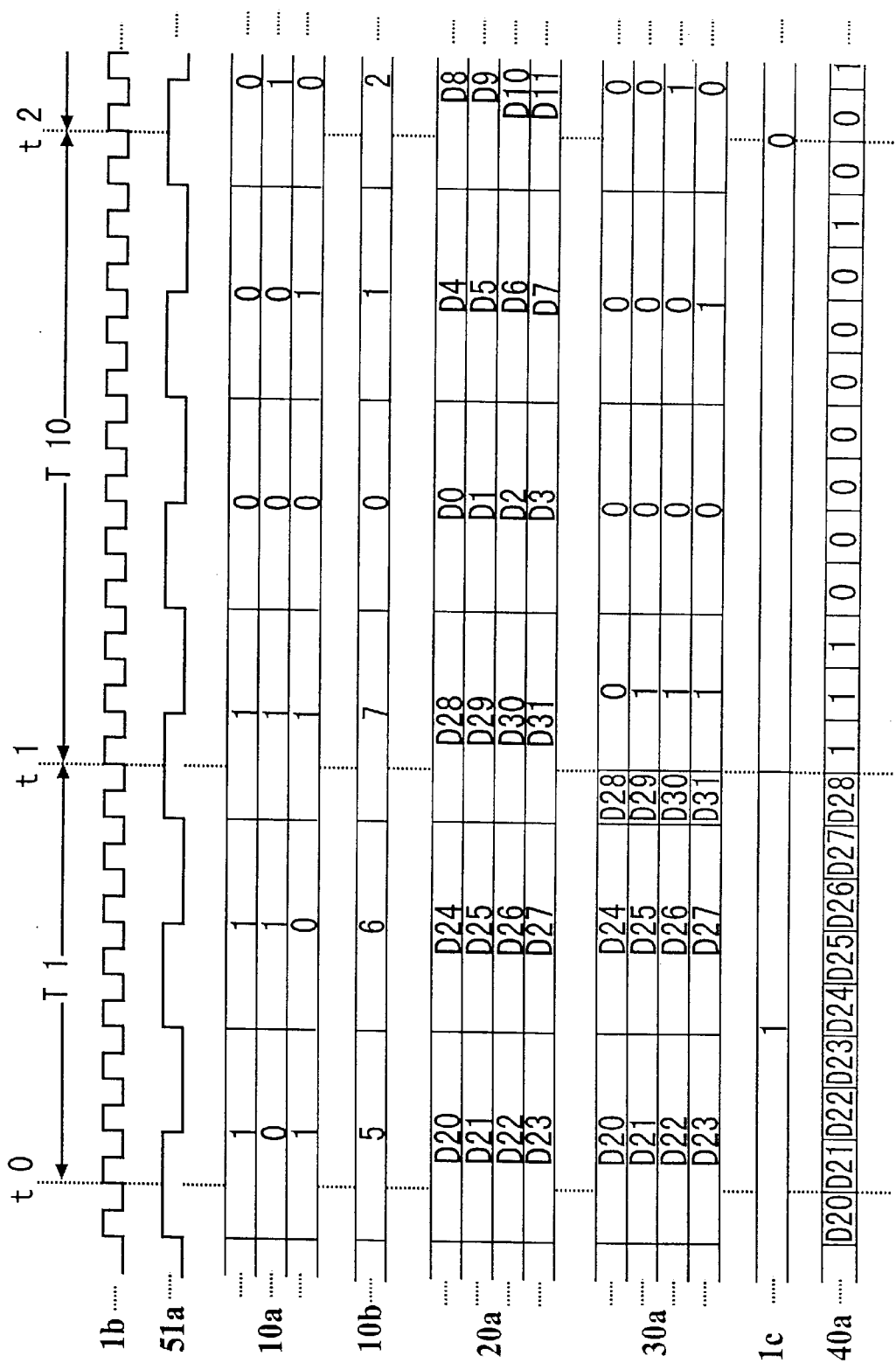

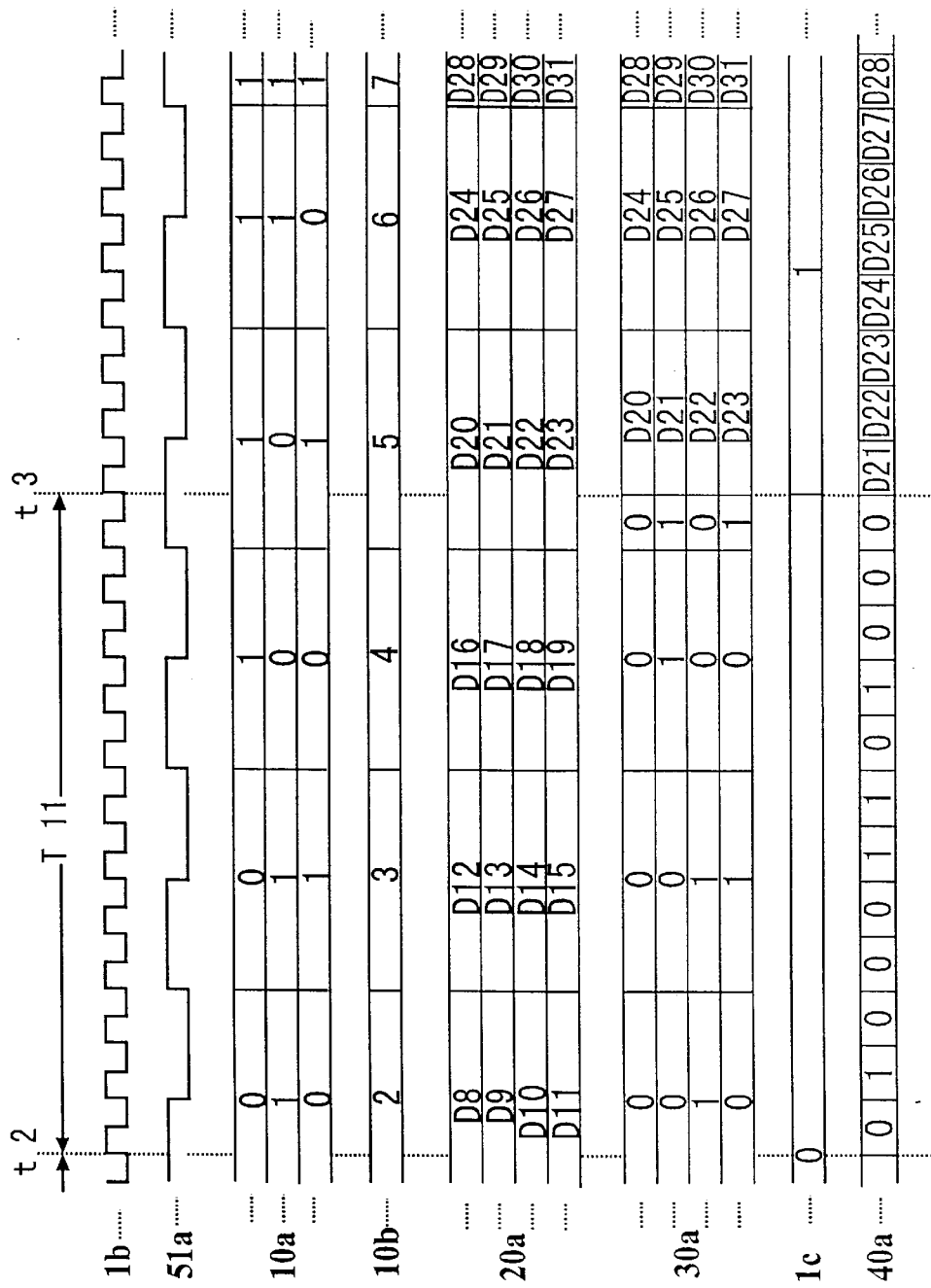

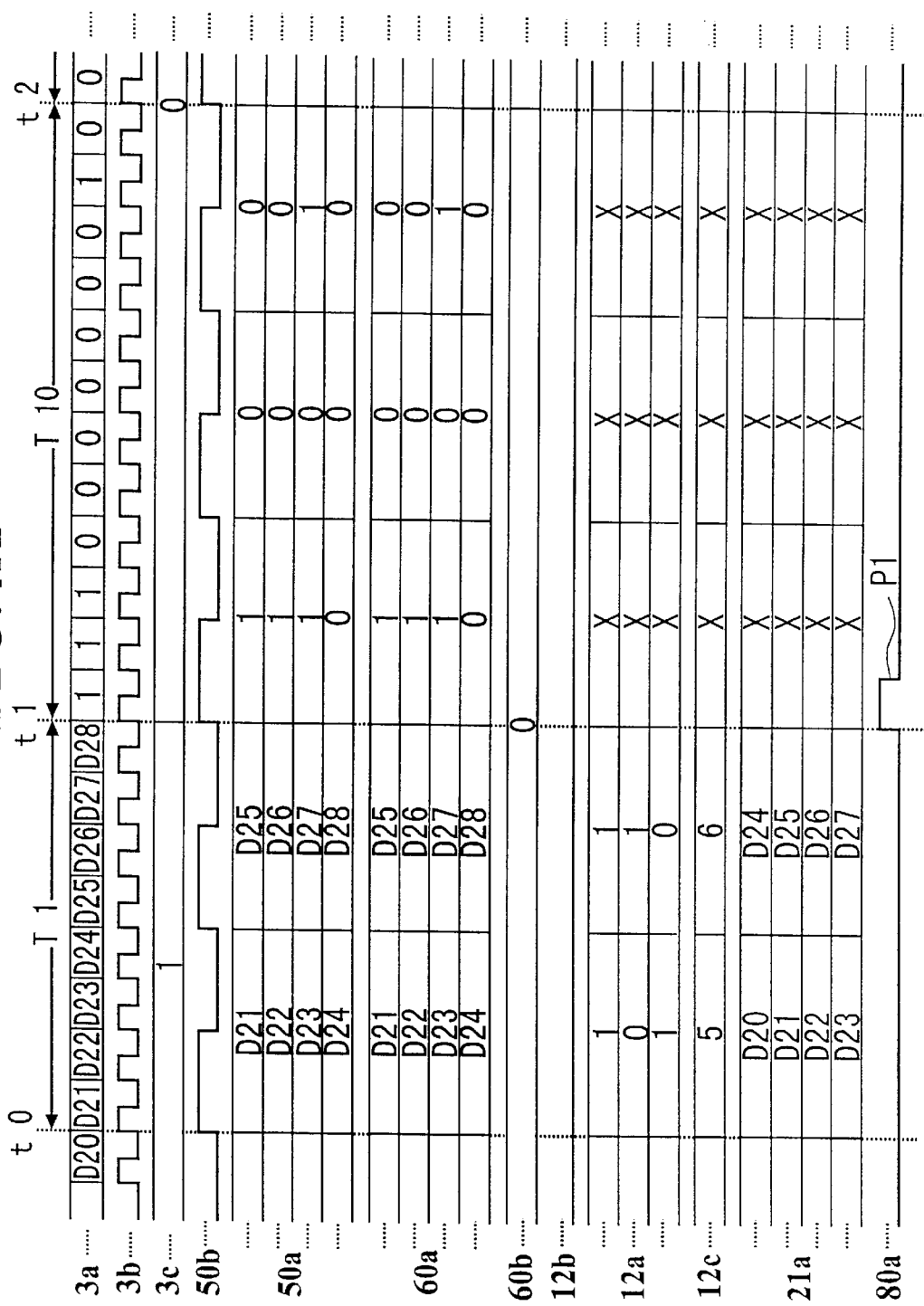

FIG.6B RELATED ART

MULTIPLEXED SIGNAL DEMULTIPLEXING DEVICE TRANSMISSION ERROR MEASURING DEVICE AND TRANSMISSION ERROR MEASURING METHOD

BACKGROUND OF THE INVENTION

1. Field of the Invention

The present invention relates to a multiplexed signal demultiplexing device, a transmission error measuring device and a transmission error measuring method, for carrying out a bit error test in order to measure errors when a signal is transmitted by a semiconductor, a transmission line or the like.

2. Description of the Related Art

Recently, various signals processed by a circuit comprising an IC (Integrated Circuit) or the like have been transmitted at higher speed in proportion to an improvement of a processing capacity of a processing unit. According to high speed transmission, it is desired that errors, such as data loss existing in a part of a transmitted signal or the like, are prevented from being caused by transmitting the signal.

In the step of manufacturing a semiconductor device or a transmission device, an error rate measuring device is used in order to discriminate a device having the property which is within the predetermined range, by measuring the error rate of the device or the like when the predetermined signal is transmitted by the device.

Hereinafter, the bit error measuring device 200 will be explained with reference to FIGS. 5, 6A and 6B as an embodiment of an error rate measuring device according to an earlier development.

FIG. 5 is a block diagram showing a constitution of the bit error measuring device 200 as an embodiment of an error rate measuring device according to an earlier development. As showing in FIG. 5, the bit error measuring device 200 inputs a signal generated by a transmitting unit 4 into an object 2 to be measured, which is a transmission line, and detects a signal outputted from the object 2 to be measured, by a receiving unit 5. Because the receiving unit 5 detects whether the signal inputted into the object 2 to be measured is transmitted through the object 2 and is outputted from the object 2 without causing a bit error or not, it is possible to measure the error rate of the object 2 to be measured.

When a clock signal 4b is inputted into the transmitting unit 4, the clock signal 4b is divided by a dividing circuit 51 with a frequency-dividing ratio of 1/n in order to generate a 1/n clock signal 51a. The 1/n clock signal 51a is inputted into an address counter 10. The address counter 10 counts up by synchronizing with the 1/n clock signal 51a in order to obtain the count value by using m bits (m: integer). The count value obtained by the address counter 10 is outputted to a memory circuit 20 as an address number 10a.

The memory circuit 20 outputs an n-bits data 20a having n bits (n: integer), which is assigned from a plurality of data stored therein by the address numbers 10a, to a multiplexing circuit 40. The multiplexing circuit 40 multiplexes the n-bits data 20a inputted thereinto by synchronizing with the clock signal 4b in order to generate a test signal 40a, and outputs the test signal 40a to the object 2 to be measured.

The clock signal 4b and the test signal 40a are inputted into the object 2 to be measured. The object 2 to be measured outputs the test signal 40a inputted thereinto as a signal 5a to be measured, and outputs a clock signal 5b.

When the signal 5a to be measured and the clock signal 5b are inputted into the receiving unit 5, the signal 5a to be measured is demultiplexed by a demultiplexing circuit 52 in order to generate a demultiplexed signal 52a which is a n-bits data. The clock signal 5b is divided by the demultiplexing circuit 52 with a frequency-dividing ratio of 1/n in order to generate a 1/n clock signal 52b. The demultiplexed signal 52a and the 1/n clock signal 52b are outputted to a data rearranging circuit 61. Further, the 1/n clock signal 52b is outputted to an address counter 11.

The address counter 11 counts up by synchronizing with the 1/n clock signal 52b in order to obtain the count value by using m bits (m: integer). The count value obtained by the address counter 11 is outputted to a memory circuit 21 as an address number 11a. The memory circuit 21 stores the same data as the memory circuit 20 therein. When the address number 11a is inputted into the memory circuit 21 from the address counter 11, the memory circuit 21 outputs data stored in an address assigned by the address number 11a to a comparing circuit 70 as an n-bits data 21a.

The demultiplexed signal 52a inputted into the data rearranging circuit 61 is outputted to the comparing circuit 70 as an n-bits data 61a. The comparing circuit 70 compares the n-bits data 21a outputted from the memory circuit 21 with the n-bits data 61a. The comparing circuit 70 detects that a bit of one n-bits data is not coincident with that of the other, which corresponds to the bit of one n-bits data, in order to output the results of the detection to a correspondence judging circuit 80 as a comparing signal 70a. When it is judged that many bits of the n-bits data 61a are not coincident with those of the n-bits data 21a on the basis of the result of comparing the two n-bits data by the comparing circuit 70, the correspondence judging circuit 80 judges that the n-bits data 61a does not correspond to the n-bits data 21a, and outputs a correspondence judging signal 80a to a timing controlling circuit 90.

Generally, when the comparing signal 70a is outputted from the comparing circuit 70, it is thought that a data loss of a signal or an error thereof is caused by transmitting the signal through the object 2 to be measured. However, when the comparing signal 70a is too frequently outputted from the comparing circuit 70, it is thought that the demultiplexing circuit 52 is wrongly operated.

That is, because many bits of the n-bits data 61a are not coincident with those of the n-bits data 21a when the signal obtained by demultiplexing the signal 5a to be measured with the demultiplexing circuit 52 is arranged in wrong order, the comparing signal 70a is frequently outputted from the comparing circuit 70. The wrong operations of the demultiplexing circuit 52 are caused by non-coincidence of timing between the demultiplexed signal 52a and the test signal 40a or by non-correspondence of the data array between the n-bits data 61a and the n-bits data 21a, which happens for some reasons when the demultiplexed signal 52a is generated by the multiplexing circuit 52. In such a state, the bit error of the object 2 to be measured cannot be measured.

In this case, the so-called pull-in operations which will be explained in detail are carried out so that the n-bits data 61a can correspond to the n-bits data 21a.

When the correspondence judging signal 80a outputted from the correspondence judging circuit 80 is inputted into the timing controlling circuit 90, a data rearrangement controlling signal 61b is outputted from the timing controlling circuit 90 to a data rearranging circuit 61 in order to rearrange the demultiplexed signal 52a by the data rearranging circuit 61. The data rearrangement controlling signal 61b inputted into the data rearranging circuit 61 has one value selected from n values having a range of 0 to (n−1).

For example, when the data having 32 bits from D0 to D31 is demultiplexed 4 bits each, there are four ways of arranging 4 bits including the bit D4. The first way is to assign the bit D4 to the bottom of 4 bits. The second way is to assign the bit D4 to the second bit from the bottom thereof. The third way is to assign the bit D4 to the third bit from the bottom thereof. The fourth way is to assign the bit D4 to the top thereof. In order to choose one way from the four ways, the data rearrangement controlling signal 61b has 4 values corresponding to the above four ways of arranging 4 bits. Therefore, because n-bits data is processed by the bit error measuring device 200, the data rearrangement controlling signal 61b chooses one value from the n values.

When the data rearrangement controlling signal 61b is inputted into the data rearranging circuit 61, the data rearranging circuit 61 rearranges the demultiplexed signal 52a according to the arranging way designated by the data rearrangement controlling signal 61b. The rearranged signal is outputted to the comparing circuit 70 as an n-bits data 61a.

The comparing circuit 70 compares the n-bits data 61a with the n-bits data 21a, again. When many bits of the n-bits data 61a are not coincident with those of the n-bits data 21a, the correspondence judging signal 80a is frequently outputted from the correspondence judging circuit 80. The data rearrangement controlling signal 61b is outputted from the timing controlling circuit 90 by the correspondence judging signal 80a so as to carry out an incremental processing (+1) for the value of the data arrangement controlling signal 61b, that is, so as to increase the value of the data arrangement controlling signal 61b by +1. In the case that the value of the data arrangement controlling signal 61b outputted in the previous pull-in operations was "n−1", the data arrangement controlling signal 61b is outputted from the timing controlling circuit 90 so that the value thereof can be "0".

When the value of the data rearrangement controlling signal 61b is changed from "n−1" to "0", a clock mask signal 11b is outputted from the timing controlling circuit 90 and is inputted into the address counter 11. The address counter 11 does not change the address number 11a by inputting the clock mask signal 11b even though the 1/n clock signal 52b is inputted thereinto. As a result, the address counter 11 outputs the same address number 11a for two cycles of the 1/n clock signal 52b.

By repeating the above operations, the n-bits data 61 can correspond to the n-bits data 21a in order to measure the error rate of the object 2 to be measured.

Figure 6B:
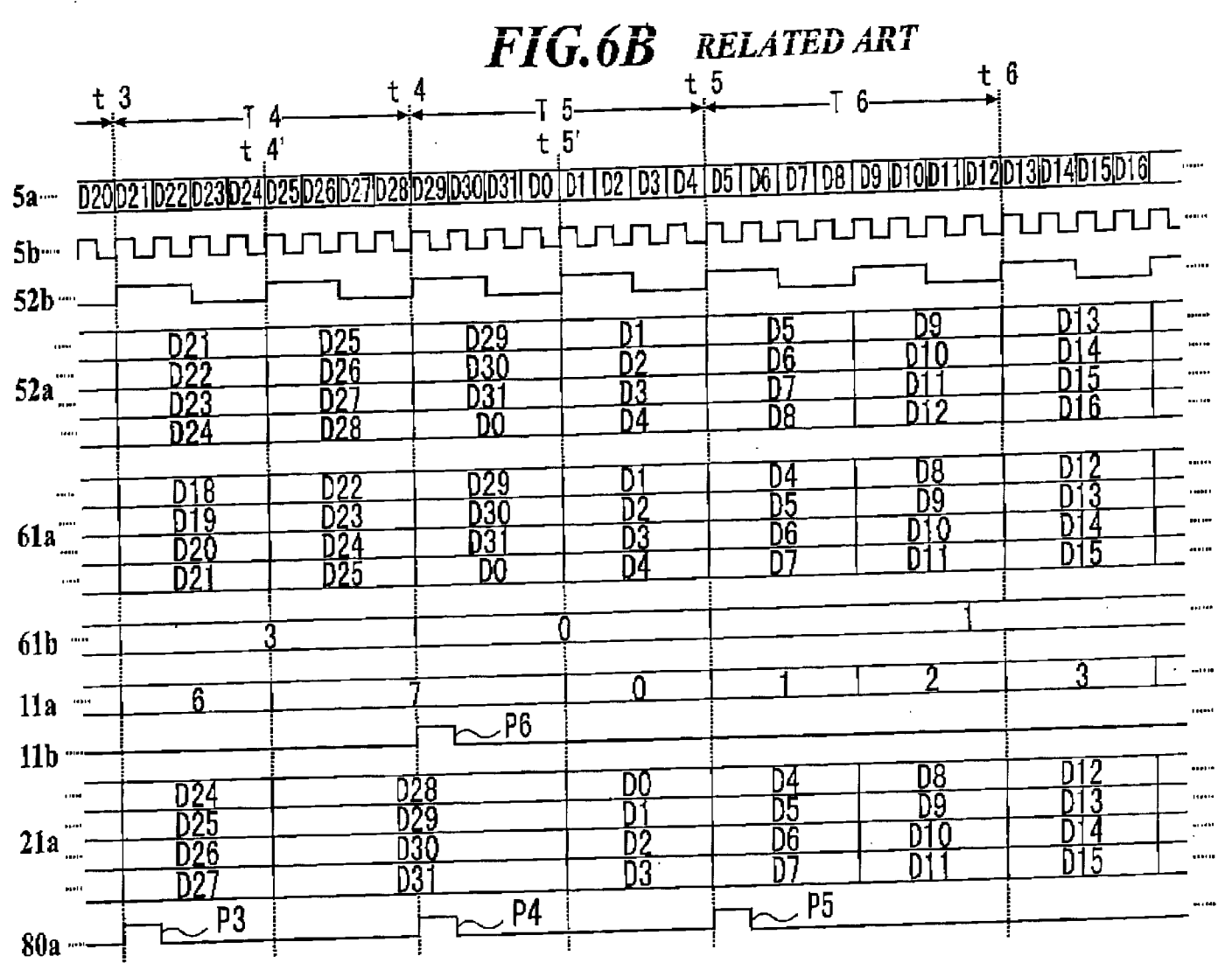

FIGS. 6A and 6B are timing charts for explaining the pull-in operations of the bit error measuring device 200. The operations of the bit error measuring device 200 are shown in these figures in the case that the number of parallel bits of a signal is 4, the number of addresses is 8 and each number of output bits of the address counters 10 and 11 is 3, that is, the number of the bits of the test signal 40a is 32.

In these figures, the reference numeral 5a denotes a signal to be measured, 5b denotes a clock signal, 52b denotes a 1/n clock signal, 52a denotes a demultiplexed signal, 61a denotes an n-bits data outputted from the data rearranging circuit 61, 61b denotes a data rearrangement controlling signal, 11a denotes an address number, 11b denotes a clock mask signal, 21a denotes an n-bits data outputted from the memory circuit 21, and 80a denotes a correspondence judging signal.

In FIG. 6A, during the period T1, that is, from the time t0 to the time t1, the n-bits data 61a outputted from the data rearranging circuit 61 does not correspond to the n-bits data 21a. At the time t1, the pulse P1 is outputted from the correspondence judging circuit 80 as the correspondence judging signal 80a. The value of the data rearrangement controlling signal 61b outputted from the timing controlling circuit 90 is changed from "0" to "1" in order to rearrange the n-bits data 61a.

Although the n-bits data 61a rearranged by the pulse P1 is outputted from the time t1, the n-bits data 61a does not correspond to the n-bits data 21a during the period T2, that is, from the time t1 to the time t2. Therefore, at the time t2, the value of the data arrangement controlling signal 61b is changed into "2" by outputting the pulse P2 to the timing controlling circuit 90 in order to rearrange the n-bits data 61a by the data rearranging circuit 61.

As shown in FIG. 6B, because the n-bits data 61a does not correspond to the n-bits data 21a during the period T4, that is, from the time t3 to the time t4, the pulse P4 is outputted to the timing controlling circuit 90 at the time t4 in order to change the value of the data rearrangement controlling signal 61b from "3" to "0". Further, because the pulse P6 is outputted from the timing controlling circuit 90 as the clock mask signal 11b at the same time, the address number 11a having the number "7" is continuously outputted after the time t4.

As a result, the n-bits data 21a having the bits "D28, D29, D30, D31" is outputted from the time t4' to the time t5'. If the clock mask signal 11b is not outputted, the n-bits data 21a having the bits "D0, D1, D2, D3" is outputted from the time t4 to the time t5'. Because the n-bits data 61a having the bits "D29, D30, D31, D0" is outputted from the time t4 to the time t5', the bit error measuring device 200 repeats the same operations that it carried out from the time t1 to the time t2 if the clock mask signal 11b is not outputted. Therefore, when the value of the data rearrangement controlling signal 61b is changed from "n−1" to "0", the clockmask signal 11b is outputted in order that the n-bits data 61a can correspond to the n-bits data 21a.

The n-bits data 61a corresponds to the n-bits data 21a at the time t5. The bit error measuring device 200 starts to measure the error rate of the object 2 to be measured.

However, in the above bit error measuring device 200, there is a problem that it takes much time that the n-bits data 61a corresponds to the n-bits data 21a. For example, in the case of the operations shown in FIGS. 6A and 6B, the period from the time t0 to the time t5 is necessary for the correspondence between two n-bits data. The period for the correspondence between two n-bits data tends to be longer than time for measuring the bit error of the object 2 to be measured. In the case that each number of the output bits of the address counter 10 and 11 is m (the number of the addresses is $2^m$), and that the number of the parallel bits of a signal is n, the data rearranging operations are carried out a maximum of $(n \times 2^m - 1)$ times in the pull-in operations. For example, in the operations shown in FIGS. 6A and 6B, the data having the bit D0 to the bit D31 is rearranged. Therefore, the data rearranging operations are carried out a maximum of 31 times.

Because it takes much time to carry out the error rate tests of many objects 2 to be measured in the manufacturing step of the objects 2 to be measured, the whole manufacturing step is not carried out efficiently. Further, there is much possibility that the cost for producing semiconductor devices or the like becomes higher.

SUMMARY OF THE INVENTION

The present invention was developed in view of these problems.

An object of the present invention is to provide a multiplexed signal demultiplexing device, a transmission error measuring device and a transmission error measuring method, which enable to finish the pull-in operations quickly before the bit error test of an object to be measured, such as a transmission line or the like, in order to carry out the bit error test thereof for a short time.

That is, in accordance with one aspect of the present invention, the multiplexed signal demultiplexing device comprises; a reference clock pulse generating circuit for outputting a reference clock pulse having a predetermined reference frequency, a counting circuit for counting by synchronizing with the reference clock pulse outputted from the reference clock pulse generating circuit, and for outputting a count value obtained by counting, a multiplexing circuit for multiplexing one signal selected from a predetermined signal and the count value outputted from the counting circuit in order to generate a multiplexed one signal, a demultiplexing circuit for demultiplexing the multiplexed one signal generated by the multiplexing circuit in order to generate a demultiplexed signal, an arranging circuit for arranging the demultiplexed signal generated by the demultiplexing circuit, and an array controlling circuit for detecting the values of bits which are set at the bottoms of demultiplexed signals generated by demultiplexing multiplexed count values outputted from the multiplexing circuit in order in which the arranging circuit arranges the demultiplexed signals generated by demultiplexing the multiplexed count values, and for changing an array of the demultiplexed signal generated by demultiplexing the multiplexed count value with the demultiplexing circuit on the basis of a change of the detected values of bits which are set at the bottoms of the demultiplexed signals.

According to the above-described present invention, in the case that when the multiplexed signal generated by multiplexing the predetermined signal is demultiplexed, a plurality of demultiplexed signals obtained by the demultiplexing operation cannot be arranged in correct order, it is possible to obtain the signals arranged in correct order quickly. That is, when the signals are arranged in correct order, the values of bits set at the bottoms of the count values outputted from the counting circuit are changed in order. For example, when the counting circuit counts up by using a binary number system, the values of bits set at the bottom the count values are repeated in order of "0, 1, 0, 1, . . . ". Therefore, in the case that even though the values of the bits set at the bottoms of the signals are detected, the values do not alternate between "0" and "1", the arrays of the signals are wrong. It is possible to obtain the signals arranged in correct order by controlling the arranging circuit in order to change the arrays of the signals.

The multiplexed signal demultiplexing device may further comprise a selecting circuit for outputting one signal selected from the predetermined signal and the count value outputted from the counting circuit, to the multiplexing circuit.

According to the present invention, in the case that when the multiplexed signal is demultiplexed, the arrays of the demultiplexed signals are wrong, it is possible to correct the arrays of the demultiplexed signals on the basis of the count values selected by the selecting circuit. Even if the signals having a wrong array are obtained, it is possible to correct the arrays quickly.

In accordance with another aspect of the present invention, the transmission error measuring device comprises: a pulse generator for outputting a pulse signal having a predetermined reference frequency, a transmitting unit for outputting a predetermined signal to an object to be measured by synchronizing with the pulse signal outputted from the pulse generator, and a receiving unit for comparing a signal which is inputted into the object to be measured and is transmitted through the object to be measured, with the predetermined signal to be outputted from the transmitting unit, and for detecting that the signal transmitted through the object to be measured is not coincident with the predetermined signal, wherein the transmitting unit comprises; a first counting circuit for counting by synchronizing with the pulse signal outputted from the pulse generator, and for outputting a count value obtained by counting with the first counting circuit, a predetermined signal output circuit storing a plurality of signals to be outputted as the predetermined signal, which correspond to the count values outputted from the first counting circuit, for outputting the predetermined signal corresponding to the count value when the count value is inputted thereinto, a selecting circuit for outputting one signal selected from the predetermined signal outputted from the predetermined signal output circuit and the count value outputted from the first counting circuit, and a multiplexing circuit for multiplexing the one signal outputted from the selecting circuit, and for outputting the multiplexed one signal to the object to be measured, the receiving unit comprises; a demultiplexing circuit for generating a demultiplexed signal by demultiplexing a signal generated by inputting the one signal outputted from the multiplexing circuit into the object to be measured and then by transferring the one signal through the object to be measured, an arranging circuit for arranging the demultiplexed signal generated by the demultiplexing circuit, an array controlling circuit for detecting the values of bits which are set at the bottoms of the demultiplexed signals arranged by the arranging circuit in order in which the arranging circuit arranges the demultiplexed signals and for changing an array of the demultiplexed signal arranged by the arranging circuit on the basis of a change of the detected values of bits which are set at the bottoms of the demultiplexed signals, when the count values outputted from the first counting circuit are outputted by the selecting circuit, a second counting circuit for counting by synchronizing with the pulse signal outputted from the pulse generator by using a count value following one which is last outputted from the selecting circuit when an output of the selecting circuit is changed from the count value to the predetermined signal as an initial value in order to output a count value obtained by counting with the second counting circuit, a comparing signal output circuit storing a plurality of signals to be outputted as the predetermined signal, which correspond to the count values outputted from the second counting circuit, for outputting the predetermined signal corresponding to the count value outputted from the second counting circuit as a comparing signal when the count value outputted from the second counting circuit is inputted thereinto, and a detecting circuit for detecting that a signal outputted from the arranging circuit is not coincident with the comparing signal outputted from the comparing signal output circuit by comparing the signal outputted from the arranging circuit with the comparing signal when the predetermined signal is outputted by the selecting circuit.

In the present invention, the object to be measured is not limited to a conductor or a signal conductor. If the object to be measured, can transmit an electric signal inputted thereinto, the object may be a semiconductor, a circuit having a plurality of semiconductors and a signal conductor connecting one semiconductor with another, or the like.

According to the above-described present invention, when the transmission error test of the object to be measured is carried out, even if the data array of the demultiplexed signal is wrong by the processing of demultiplexing the multiplexed signal transmitted through the object and then arranging the demultiplexed signal, it is possible to rearrange the demultiplexed signal correctly by demultiplexing the multiplexed first count value outputted from the first counting circuit and by detecting the values of the bits set at the bottoms of the arranged signals in order to judge whether the signals has the correct array or not.

That is, whenever the first counting circuit counts, the values of the bits set at the bottoms of the first count values outputted from the first counting circuit are changed. For example, when the counting operation is carried out by using the two values (the binary number system), the bits set at the bottoms of the count values alternate between "0" and "1". Therefore, it is possible to judge whether the signals has the correct array or not, by detecting the bits set at the bottoms thereof.

Because before the bit error caused by transmitting the signal through the object to be measured is measured, the data array control processing can be carried out quickly, it takes a short time to carry out the measuring operations for the object to be measured. Further, the bit error measurement can be efficiently carried out. The cost of the transmission error measurement can be lower.

When the output of the selecting circuit is changed from the first count value to the predetermined signal, the second counting circuit counts by using the count value following one which is last outputted from the selecting circuit as an initial value. For example, in the case that when the first counting circuit counts by using the two value (the binary number system), the selecting circuit outputs the value "1, 0, 0", and then outputs the predetermined signals, the second counting circuit counts by using the initial value "1, 0, 1".

The predetermined signal outputted from the transmitting unit necessarily corresponds to the comparing signal generated by the receiving unit. After the data array rearranged by the arranging circuit became correct, the transmission error measurement for the object to be measured can be carried out quickly.

In accordance with another aspect of the present invention, the transmission error measuring method for measuring a bit error of an object to be measured by using a transmission error measuring device which comprises; a pulse generator for outputting a pulse signal having a predetermined reference frequency, a transmitting unit for outputting a predetermined signal to the object to be measured by synchronizing with the pulse signal outputted from the pulse generator, and a receiving unit for comparing a signal which is inputted into the object to be measured and is transmitted through the object to be measured, with the predetermined signal to be outputted from the transmitting unit, and for detecting that the signal transmitted through the object to be measured is not coincident with the predetermined signal; comprises the steps of: in the transmitting unit, counting by synchronizing with the pulse signal outputted from the pulse generator, and outputting a first count value obtained by counting, storing a plurality of signals to be outputted as the predetermined signal, which correspond to the first count values, and outputting the predetermined signal corresponding to the first count value, which is selected from the plurality of signals, outputting one signal selected from the outputted predetermined signal and the first count value, and multiplexing the outputted one signal, and outputting the multiplexed one signal to the object to be measured, in the receiving unit, generating a demultiplexed signal by demultiplexing a signal generated by inputting the multiplexed one signal outputted from the transmitting unit into the object to be measured and then by transferring the one signal through the object to be measured, arranging the generated demultiplexed signal, detecting the values of bits which are set at the bottoms of the arranged demultiplexed signals in order in which the demultiplexed signals are arranged and changing an array of the arranged demultiplexed signal on the basis of a change of the detected values of bits which are set at the bottoms of the demultiplexed signals, when the first count values are inputted into the object to be measured, counting by synchronizing with the pulse signal outputted from the pulse generator by using the first count value following one which is last outputted when the one signal outputted from the object to be measured is changed from the first count value to the predetermined signal as an initial value in order to output a second count value, storing a plurality of signals to be outputted as the predetermined signal, which correspond to the second count values, and outputting the predetermined signal corresponding to the second count value as a comparing signal when the second count value is inputted, and detecting that the arranged demultiplexed signal is not coincident with the comparing signal by comparing the arranged demultiplexed signal with the comparing signal when the predetermined signal is inputted into the object to be measured.

According to the present invention, because before the bit error caused by transmitting the signal through the object to be measured is measured, the data array control processing can be carried out quickly, it takes a short time to carry out the measuring operations for the object to be measured. Further, the bit error measurement can be efficiently carried out. The cost of the transmission error measurement can be lower.

The predetermined signal outputted from the transmitting unit necessarily corresponds to the comparing signal generated by the receiving unit. After the rearranged data array became correct, the transmission error measurement for the object to be measured can be carried out quickly.

In accordance with another aspect of the present invention, the transmission error measuring device for measuring a bit error of an object to be measured comprises; a first counting circuit for counting in order to obtain a first count value, a test data outputting circuit for outputting a test data corresponding to the first count value, a selecting circuit for selecting one signal between the first count value and the test data, a demultiplexing circuit for demultiplexing the selected one signal transmitted through the object to be measured, an arranging circuit for arranging the demultiplexed one signal having a plurality of bits, a data array monitoring circuit for monitoring an array of the first count value arranged by arranging circuit when the first count value is selected by the selecting circuit in order to rearrange the first count value arranged by arranging circuit, a second counting circuit for counting by using an initial value decided on the basis of the first count value rearranged by the arranging circuit in order to obtain a second count value, a reference data outputting circuit for outputting a reference data corresponding to the second count value, and a comparing circuit for comparing the test data rearranged by rearranging the first count value with the reference data outputted from the reference data outputting circuit; wherein the data array monitoring circuit rearranges the first count value by using a bit set at the bottom thereof.

The transmission error measuring device may further comprise, a multiplexing circuit for multiplexing the selected one signal which is a parallel bit signal, in order to transmit the one signal multiplexed thereby through the object to be measured.

In accordance with another aspect of the present invention, the transmission error measuring method for measuring a bit error of an object to be measured comprises the steps of; counting in order to obtain a first count value, outputting a test data corresponding to the first count value, selecting one signal between the first count value and the test data, demultiplexing the selected one signal transmitted through the object to be measured, arranging the demultiplexed one signal having a plurality of bits, monitoring an array of the arranged first count value when the first count value is selected in order to rearrange the arranged first count value, counting by using an initial value decided on the basis of the rearranged first count value in order to obtain a second count value, outputting a reference data corresponding to the second count value, and comparing the test data rearranged by rearranging the first count value with the reference data; wherein the first count value is rearranged by using a bit set at the bottom thereof.

The transmission error measuring method may further comprise a step of multiplexing the selected one signal which is a parallel bit signal, in order to transmit the multiplexed one signal through the object to be measured.

BRIEF DESCRIPTION OF THE DRAWINGS

The present invention will become more fully understood from the detailed description given hereinbelow and the accompanying drawings which are given by way of illustration only, and thus are not intended as a definition of the limits of the present invention, and wherein;

FIGS. 3A and 3B are time charts showing the pull-in operations of the bit error measuring device shown in FIG. 1;

FIGS. 4A and 4B are time charts showing the pull-in operations of the bit error measuring device shown in FIG. 1;

FIGS. 6A and 6B are time charts showing the operations of the bit error measuring device shown in FIG. 5.

PREFERRED EMBODIMENT OF THE INVENTION

Hereinafter, an embodiment of the bit error measuring device according to the present invention will be explained in detail with reference to FIGS. 1 to 4.

Figure 1:
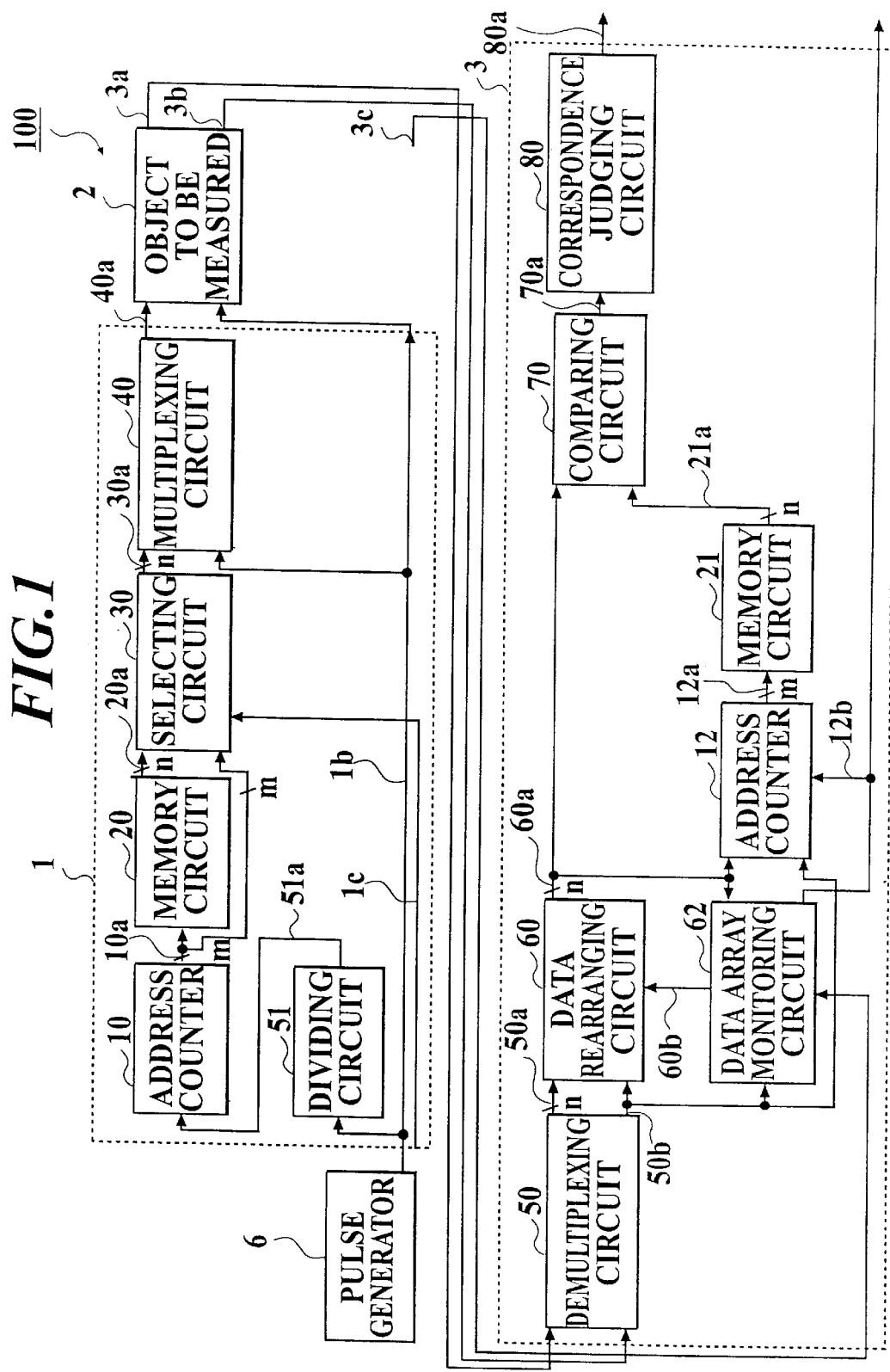
FIG. 1 is a block diagram schematically showing a construction of a bit error measuring device according to the present invention.

FIG. 1 is a block diagram schematically showing a construction of a bit error measuring device 100. In this figure, the bit error measuring device 100 comprises a transmitting unit 1 and a receiving unit 3. An object 2 to be measured is connected with the transmitting unit 1 and the receiving unit 3.

The transmitting unit 1 comprises a dividing circuit 51, an address counter 10, a memory circuit 20, a selecting circuit 30 and a multiplexing circuit 40. A clock signal 1b outputted from a pulse generator 6, is inputted into the dividing circuit 51 and into the multiplexing circuit 40.

The receiving unit 3 comprises a demultiplexing circuit 50, a data rearranging circuit 60, a data array monitoring circuit 62, an address counter 12, a memory circuit 21, a comparing circuit 70 and a correspondence judging circuit 80. The same elements as the bit error measuring device 200 are denoted by the same reference numerals.

In the transmitting unit 1, a selection controlling signal 1c outputted from a device which is not shown in the figure, is inputted into the selecting circuit 30. In the receiving unit 3, an operation noticing signal 3c outputted from a device which is not shown in the figure, is inputted into the data array monitoring circuit 62. The selection controlling signal 1c and the operation noticing circuit 3c indicate that the bit error measuring device 100 measures the bit error rate of the object 2 to be measured or that the device 100 carries out the pull-in operations for measuring the bit error rate. In the bit error measuring device 100, while the pull-in operations are carried out, the value of the selection controlling signal 1c and that of the operation noticing circuit 3c are "0".

The dividing circuit 51 divides the clock signal 1b outputted from the pulse generator 6 with a frequency-dividing ratio of 1/n in order to generate a 1/n clock signal 51a. The dividing circuit 51 outputs the 1/n clock signal 51a to the address counter 10.

When the 1/n clock signal 51a outputted from the dividing circuit 51 is inputted into the address counter 10, the address counter 10 counts up by synchronizing with the 1/n clock signal 51a in order to obtain the count value by using m bits (m: integer). The count value obtained by the address counter 10 is outputted to the memory circuit 20 and to the selecting circuit 30 as an address number 10a.

The memory circuit 20 stores a plurality of data therein. When the address number 10a outputted from the address counter 10 is inputted into the memory circuit 20, the memory circuit 20 outputs an n-bits data 20a assigned by the address numbers 10a to the selecting circuit 30.

The n-bits data 20a outputted from the memory circuit 20 and the selection controlling signal 1c outputted from the device which is not shown in the figure are inputted into the selecting circuit 30. The selecting circuit 30 selects one data between the n-bits data 20 and the address number 10a according to the value of the selection controlling signal 1c in order to output the selected data to the multiplexing circuit 40 as a selection output signal 30a. That is, when the selection controlling signal 1c indicates that the bit error measuring device 100 carries out the pull-in operations, the address number 10a is selected in order to output the address number 10a to the multiplexing circuit 40 as a selection output signal 30a. When the selection controlling signal 1c indicates that the bit error measuring device 100 measures the bit error rate of the object 2 to be measured, the n-bits data 20a is selected in order to output the n-bits data 20a to the multiplexing circuit 40 as a selection output signal 30a.

The multiplexing circuit 40 multiplexes the selection output signal 30a outputted from the selecting circuit 30 by synchronizing with the clock signal 1b outputted from the pulse generator 6 in order to generate a test signal 40a. The generated test signal 40a is outputted to the object 2 to be measured.

The object 2 to be measured is an electronic part for transmitting a signal, for example, a semiconductor device, such as an IC (Integrated Circuit), a signal transmitting device, a transmitting line or the like. The test signal 40a outputted from the multiplexing circuit 40 and the clock signal 1b outputted from the pulse generator 6 are inputted into the object 2 to be measured. The object 2 to be measured outputs the test signal 40a to the demultiplexing circuit 50 as a signal 3a to be measured without processing the test signal 40a and outputs the clock signal 1b to the demultiplexing circuit 50 as a clock signal 3b.

The demultiplexing circuit 50 demultiplexes the signal 3a to be measured which is outputted from the object 2 to be measured by synchronizing with the clock signal 3b in order to generate the demultiplexed signal 50a. The demultiplexed signal 50a is outputted to the data rearranging circuit 60. The demultiplexing circuit 50 divides the clock signal 3b outputted from the object 2 to be measured with a frequency-dividing ratio of 1/n in order to generate a 1/n clock signal 50b. The 1/n clock signal 50b is outputted to the data array monitoring circuit 62, to the data rearranging circuit 60 and to the address counter 12.

The data rearranging circuit 60 rearranges the demultiplexed signal 50a outputted from the demultiplexing circuit 50 by synchronizing with the 1/n clock signal 50b outputted from the demultiplexing circuit 50 according to the data rearrangement controlling signal 60b outputted from the data array monitoring circuit 62 which will be explained below. The n-bits data 60a generated by the rearrangement operation is outputted to the comparing circuit 70, to the data array monitoring circuit 62 and to the address counter 12.

The n-bits data 60a outputted from the data rearranging circuit 60, the 1/n clock signal 50b outputted from the demultiplexing circuit 50 and the operation noticing signal 3c outputted from the device which is not shown in the figure are inputted into the data array monitoring circuit 62. When the operation noticing signal 3c indicates that the bit error measuring device 100 carries out the pull-in operations, the data array monitoring circuit 62 monitors the bit which is set at the bottom of the n-bits data 60a outputted from the data rearranging circuit 60 in order to output the result of monitoring the bit to the data rearranging circuit 60 as a data rearrangement controlling signal 60b. When the data array monitoring circuit 62 judges that the data array of the n-bits data 60a is decided on the basis of the result of monitoring the bit, the data rearrangement finishing signal 12b is generated in order to output it to the address counter 12 and to the devices or the like (not shown in the figure), which are connected with the bit error measuring device 100. As a result, the pull-in operation is finished.

The data rearrangement controlling signal 60b has one value selected from n values. For example, when four bits are arranged, there are four ways for arranging the four bits. The data rearrangement controlling signal 60b can designate one way from the four way by selecting one value from the four values.

When the pull-in operations are carried out, the data array monitoring circuit 62 monitors whether the values of the bits set at the bottoms of the n-bits data 60a repeatedly alternate between "1" and "0". When the values of the bits set at the bottoms of the n-bits data 60a do not repeatedly alternate between "1" and "0", the data array monitoring circuit 62 outputs the data rearrangement controlling signal 60b so as to carry out an incremental processing (+1) for the value of the data arrangement controlling signal 60b, that is, so as to increase the value of the data rearrangement controlling signal 60b by +1. In the case that the value of the data rearrangement controlling signal 60b outputted before the incremental processing was "n−1", the data rearrangement controlling signal 60b is outputted so that the value thereof can be "0" by carrying out the incremental processing.

When the values of the bits set at the bottoms of the n-bits data 60a repeatedly alternate between "1" and "0", the data array monitoring circuit 62 judges that the data array of the n-bits data 60a is decided. The data array monitoring circuit 62 holds the value of the data rearrangement controlling signal 60b, and outputs the data rearrangement finishing signal 12b.

Figure 2:
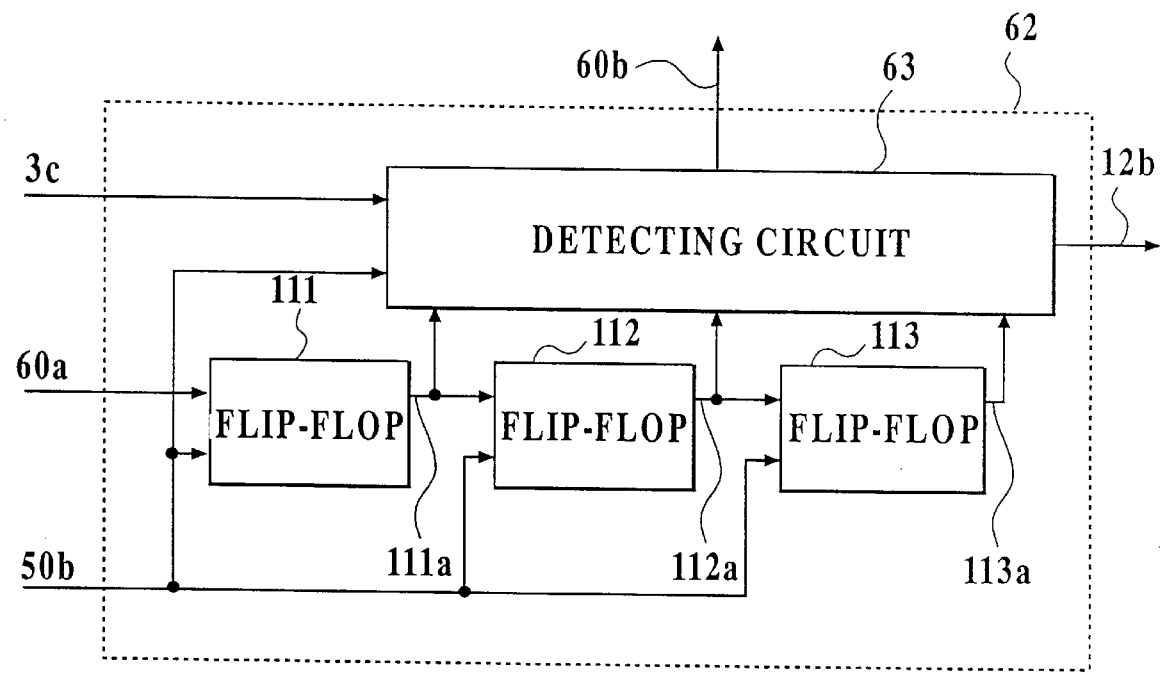
FIG. 2 is a block diagram showing a construction of a data array monitoring circuit shown in FIG. 1.

FIG. 2 is a block diagram schematically showing a construction of the data array monitoring circuit 62. As shown in FIG. 2, the data array monitoring circuit 62 comprises a detecting circuit 63, and three flip-flops 111, 112 and 113.

The 1/n clock signal 50b is inputted into the flip-flops 111, 112 and 113. Further, the n-bits data 60a is inputted into the flip-flop 111. When the n-bits data 60a is inputted into the data array monitoring circuit 62, only the data of the bit set at the bottom of the n-bits data 60a is held by the flip-flop 111. The held data is outputted to the flip-flop 112 and to the detecting circuit 63 as a data 111a by synchronizing with the 1/n clock signal 50b. The flip-flop 112 holds the data 111a outputted from the flip-flop 111, and outputs the held data to the flip-flop 113 and to the detecting circuit 63 as a data 112a. The data 112a inputted into the flip-flop 113 is held by the flip-flop 113, and outputs a data 113a to the detecting circuit 63. For example, when the data of the bit which is set at the bottom of the n-bits data 60a is inputted into the data array monitoring circuit 62 in order of "0, 1, 0", the value "0" is outputted from the flip-flop 111, "1" is outputted from the flip-flop 112, and "0" is outputted from the flip-flop 113.

The operation noticing signal 3c and the 1/n clock signal 50b are inputted into the detecting circuit 63. Further, each data of the bits set at the bottoms of the n-bits data 60a, which is outputted from the flip-flops 111, 112 and 113 is inputted into the detecting circuit 63. When the operation noticing signal 3c indicates that the pull-in operations are carried out, that is, when the value of the operation noticing signal 3c is "0", the detecting circuit 63 judges whether the data outputted from the flip-flops 111, 112 and 113 are arranged so as to alternate between non and "1". When the detecting circuit 63 detects that the data do not alternate between "0" and "1", the detecting circuit 63 outputs the data rearrangement controlling signal 60b to the data rearranging circuit 60 so as to carry out an incremental processing (+1) for the value of the data rearrangement controlling signal 60b. When the detecting circuit 63 detects that the data alternate between "0" and "1", the detecting circuit 63 holds the value of the data rearrangement controlling signal 60b, and outputs the data rearrangement finishing signal 12b.

When the data outputted from the flip-flops 111, 112 and 113 are arranged so as to alternate between "0" and "1", the three data are arranged in order of "0, 1, 0" or "1, 0, 1". Therefore, the detecting circuit 63 may judge whether the array of the three data is "0, 1, 0" or "1, 0, 1", or not.

When the data rearrangement finishing signal 12b is inputted into the address counter 12, the address counter 12 counts up by synchronizing with the 1/n clock signal 50b outputted from the demultiplexing circuit 50 in order to obtain the count value by using the m bits (m: integer). The count value obtained by the address counter 12 is outputted to the memory circuit 21 as an address number 12a.

The memory circuit 21 stores the same data as the memory circuit 20 therein. When the address number 12a outputted from the address counter 12 is inputted into the memory circuit 21, the memory circuit 21 outputs data stored in an address assigned by the address number 12a to a comparing circuit 70 as an n-bits data 21a.

The comparing circuit 70 compares the n-bits data 60a outputted from the data rearranging circuit 60 with the n-bits data 21a outputted from the memory circuit 21 in order to output the results of detecting the different bit from each other to a correspondence judging circuit 80 as a comparing signal 70a.

When the comparing signal 70a outputted from the comparing circuit 70 is inputted into the correspondence judging circuit 80 more often than the predetermined standard, the correspondence judging circuit 80 does not judge that the non-coincidence of two signals is caused by the characteristics of the object 2 to be measured. The correspondence judging circuit 80 judges that the n-bits data 60a does not correspond to the n-bits data 21a in order to output the pulse indicating the non-correspondence between the two data as a correspondence judging signal 80a.

The bit error measuring device 100 may have a construction in which the correspondence judging signal 80a is outputted to the device (not shown in the figure) which outputs the selection controlling signal 1c and the operation noticing signal 3c.

FIGS. 3A, 3B, 4A and 4B are timing charts showing the pull-in operations according to the bit error measuring device 100. Hereinafter, the pull-in operations of the bit error measuring device 100 will be explained with reference to FIGS. 3A, 3B, 4A and 4B.

The timing charts shown in FIGS. 3A, 3B, 4A and 4B show the case that the number of parallel bits of a signal is 4, the number of addresses is 8 and each number of output bits of the address counters 10 and 12 is 3, that is, the number of the bits of the test signal 40a is 32. Therefore, the above-described n is 4, and m is 3.

In FIGS. 3A and 3B, the reference numeral 1b denotes a clock signal, 51a denotes a 1/n clock signal outputted from the dividing circuit 51, 10a denotes an address number outputted from the address counter 10, 10b denotes a value obtained by carrying out the binary to decimal conversion of the address number 10a, 20a denotes an n-bit data outputted from the memory circuit 20, 30a denotes a selection output signal, 1c denotes a selection controlling signal and 40a denotes a test signal.

Figure 4B:
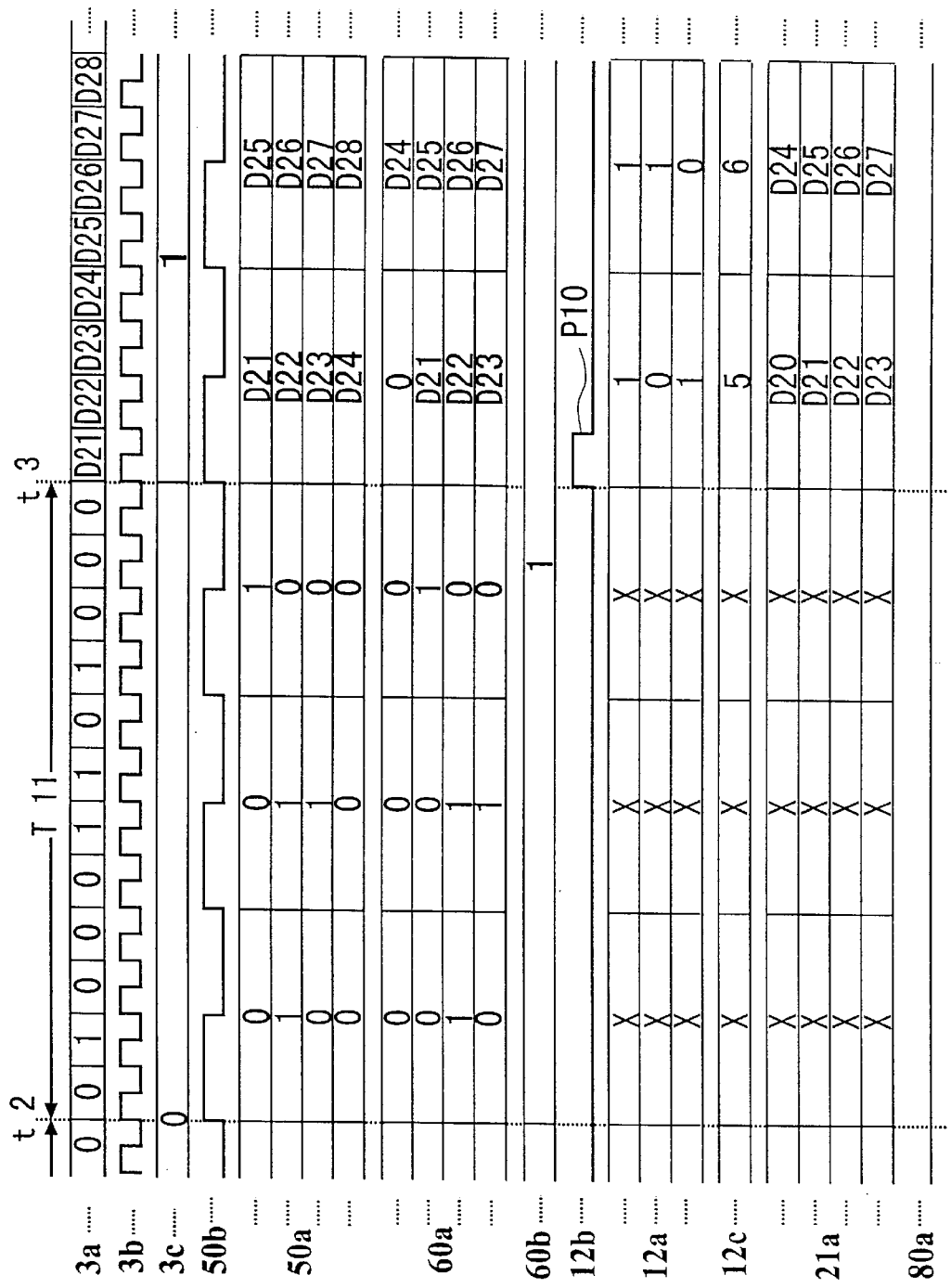
Figure 5:
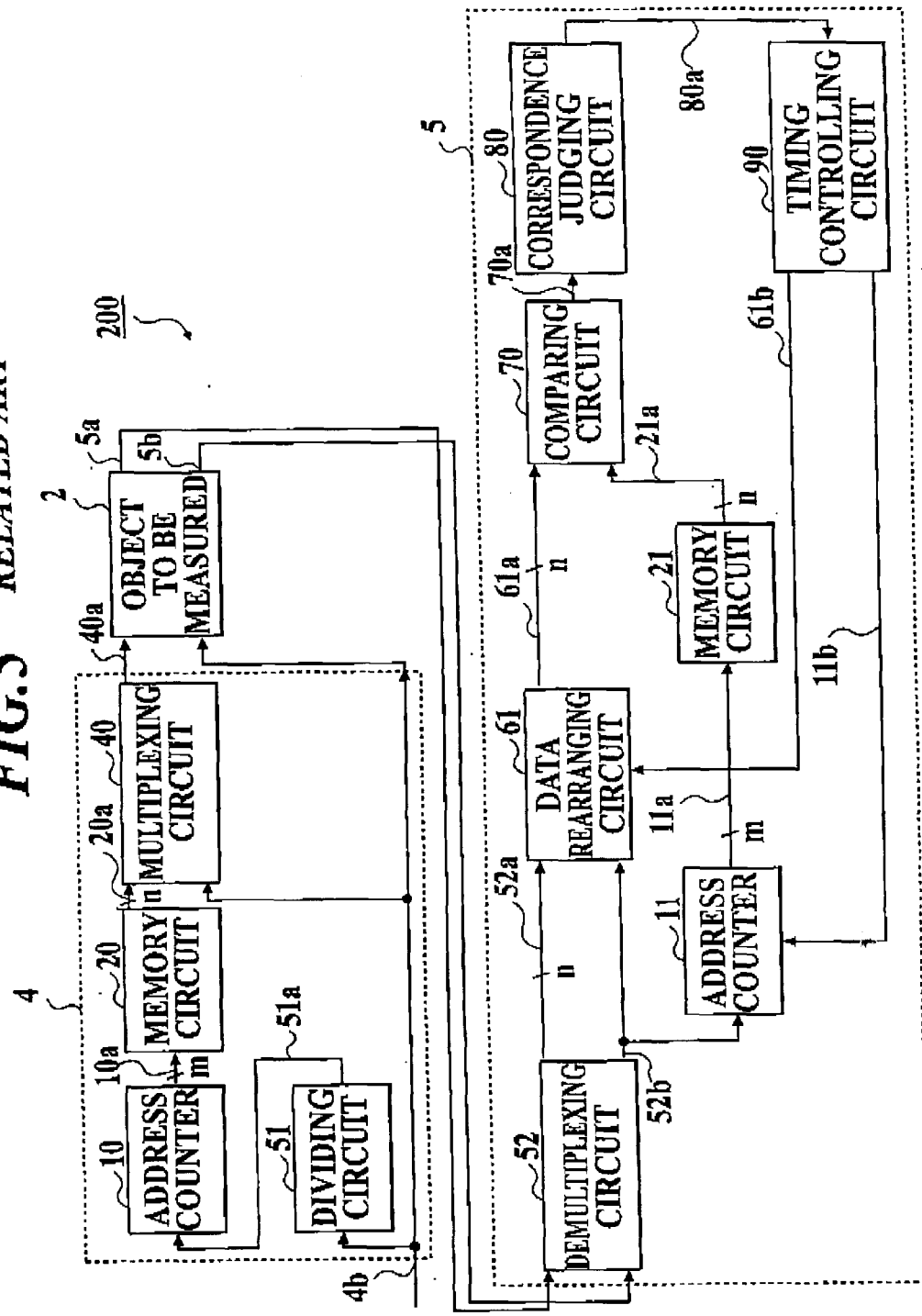
FIG. 5 is a block diagram schematically showing a construction of a bit error measuring device according to an earlier development.
Figure 6A:
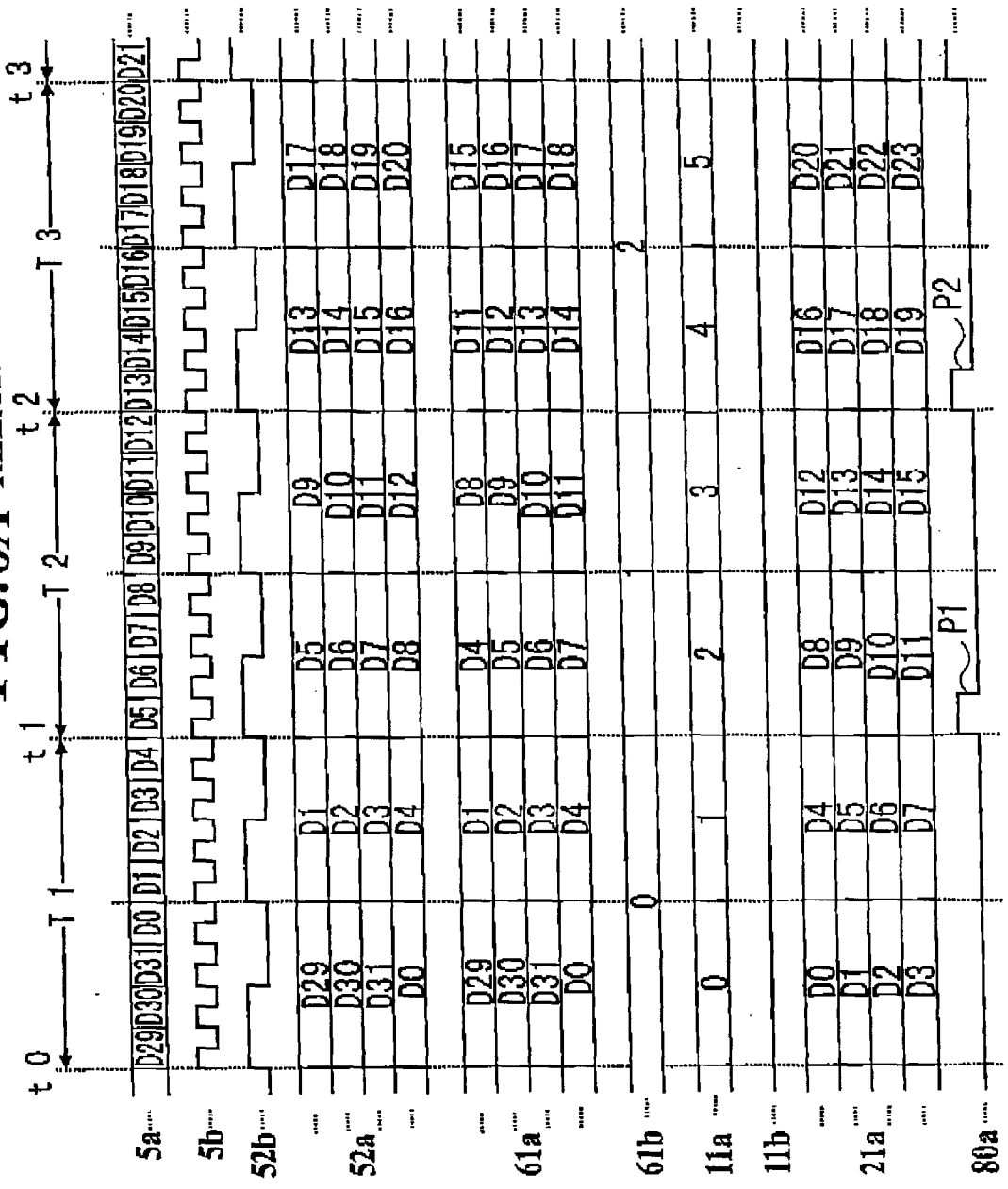

In FIGS. 4A and 4B, the reference numeral 3a denotes a signal to be measured, 3b denotes a clock signal outputted from the object 2 to be measured, 3c denotes an operation noticing signal, 50b denotes a 1/n clock signal outputted from the demultiplexing circuit 50, 50a denotes a demultiplexed signal, 60a denotes an n-bits data outputted from the data rearranging circuit 60, 60b denotes a data rearrangement controlling signal, 12b denotes a data rearrangement finishing signal, 12a denotes an address number outputted from the address counter 12, 12c denotes a value obtained by carrying out the binary to decimal conversion of the address number 12a, 21a denotes an n-bits data outputted from the memory circuit 21 and 80a denotes a correspondence judging signal.

Each time t0, t1, t2 and t3, and each period T1, T10 and T11 shown in FIGS. 3A and 3B denote the same time and the same period as FIGS. 4A and 4B.

During the period T1, that is, from the time t0 to the time t1, the test signal 40a outputted from the transmitting unit 1 to the object 2 to be measured is inputted into the receiving unit 3 as a signal 3a to be measured without processing the test signal 40a. The demultiplexed signal 50a is generated by the demultiplexing circuit 50 in order to output to the data rearranging circuit 60. The data rearranging circuit 60 outputs the demultiplexed signal 50a outputted from the demultiplexing circuit 50 to the comparing circuit 70 as an n-bits data 60a without processing the demultiplexed signal 50a.

The n-bits data 21a assigned by the address number 12a outputted from the address counter 12 is outputted in order to compare the n-bits data 21a with the n-bits data 60a by the comparing circuit 70.

During the period T1 from the time t1 to the time t2, the n-bits data 60a precedes the n-bits data 21a by one bit. Because the n-bits data 60a does not correspond to the n-bits data 21a at all, the comparing signals indicating non-correspondence of the data array between two n-bits data are outputted from the comparing circuit 70 to the correspondence judging circuit 80 with respect to many bits. The correspondence judging circuit 80 judges that the n-bits data 60a does not precisely correspond to the n-bits data 21a in order to output pulse P1 as a correspondence judging circuit 80 at the time t1.

At the time t1, when the pulse P1 is outputted as a correspondence judging signal 80a, the value of the selection controlling signal 1c and that of the operation noticing signal 3c are changed from "1" to "0" in order to start the pull-in operations.

From the time t1, the selecting circuit 30 switches from output of the n-bits data 20a to that of the address number 10a. The address number 10a which is a count value obtained by the address counter 10 is outputted as a selection output signal 30a. Because the incremental processing (+1) for the value of the selection output signal 30a is carried out by synchronizing with the 1/n clock signal 51a, the value of the bit set at the bottom of the selection output signal 30a alternates between "0" and "1".

The selection output signal 30a is multiplexed by the multiplexing circuit 40 so as to generate the test signal 40a. The test signal 40a is inputted into the receiving unit 3 through the object 2 to be measured. The demultiplexed signal 50a is demultiplexed by the demultiplexing circuit 50 so as to generate the demultiplexed signal 50a. The value "0" of the bit which is set at the bottom of the demultiplexed signal 50a continues from the time t1. The reason why the value "0" continues is that the bit to be set at the bottom of the demultiplexed signal 50a, which exists in test signal 40a is set at the second bit from the bottom of the demultiplexed signal 50a.

The values of the bits set at the bottoms of the demultiplexed signals 50a inputted during the period T10 from the time t1 to the time t2 are detected by the detecting circuit 63 of the data array monitoring circuit 62. As a result, the values are arranged in order of "0, 0, 0". Because the value "0" continues, the value of the data rearrangement controlling signal 60b is changed from "0" to "1".

The demultiplexed signal 50a is rearranged by the data rearranging circuit 60. The rearranged data is outputted as an n-bits data 60a from the time t2.

The values of bits set at the bottoms of the n-bits data 60 are outputted during the period T11 from the time t2 to the time t3 in order to detect them by the detecting circuit 63 of the data array monitoring circuit 62. The values of the bits set at the bottoms of the n-bits data 60 are arranged in order of "0, 1, 0" during the period T11. As a result, the values of the data alternate between "0" and "1". Because the bits set at the bottoms of the n-bits data 60a are coincident with those of the selection output signals 30a, the data array monitoring circuit 62 judges that the data array of the n-bits data 60a is decided. The pulse P10 is outputted from the detecting circuit 63 of the data array monitoring circuit 62 as a data rearrangement finishing signal 12a at the time t3.

When the pulse P10 is outputted from the data array monitoring circuit 62, the address counter 12 carries out an incremental processing (+1) for the value of the n-bits data 60a which was outputted immediately before the pulse P10 is outputted. The address counter 12 counts up from the t3 by using the value obtained by carrying out the incremental processing as an initial value. In the example shown in FIG. 4B, because the value of the n-bits data 60a outputted immediately before the time t3 is "0100", the address counter 12 counts up by using an initial value "101".

When the values of the selection controlling signal 1c and the operation noticing signal 3c are changed into "1", the n-bits data 20a is outputted as a selection output signal 30a in order to start measuring the object 2 to be measured.

As described above, the bit error measuring device 100 which is an embodiment according to the present invention has a construction in which the transmitting unit 1 comprises a selecting circuit 30 and the receiving unit 3 comprises a data array monitoring circuit 62. When the pull-in operations are carried out, the data array monitoring circuit 62 monitors the array of the n-bits data 60a on the basis of the count value obtained by the address counter 10. Because the pull-in operations are carried out by the detection of the array of the n-bits data and by the rearrangement of the count value, the pull-in operations can be finished in a shorter time as compared with the case of rearranging the n-bits data.

That is, because the address counter 10 counts up in order to obtain the count value represented by the binary number, the values of the bits set at the bottoms of the address numbers 10a outputted from the address counter 10 alternate between "0" and "1". Therefore, the rearrangement operations of the count value are carried out until the values of the bits set at the bottoms of the count values outputted from the data rearranging circuit 60 alternate between "0" and "1". In the operations shown in FIGS. 3A, 3B, 4A and 4B, the count value may be rearranged a maximum of 3 times. As a result, the measuring operations for the object 2 to be measured can start in a short time.

Although the bit error measuring device 100 has a construction in which the device for outputting the selection controlling signal 1c and the device for outputting for the operation noticing signal 3c are arranged outside of the bit error measuring device 100 in the above embodiment, the bit error measuring device may comprise a circuit for outputting the selection controlling signal 1c and the operation noticing signal 3c on the basis of the correspondence judging signal 80a inside the bit error measuring device. Further, various changes and modifications may be made to the present invention without departing from the gist thereof.

The entire disclosure of Japanese Patent Application No. Tokugan-Hei 10-87790 filed on Mar. 31, 1998 including specification, claims drawings and summary are incorporated herein by reference in its entirety.

What is claimed is:

1. A multiplexed signal demultiplexing device comprising;
    a reference clock pulse generating circuit for outputting a reference clock pulse having a predetermined reference frequency,
    a counting circuit for counting by synchronizing with the reference clock pulse outputted from the reference clock pulse generating circuit, and for outputting a count value obtained by counting,
    a multiplexing circuit for multiplexing one signal selected from a predetermined signal and the count value outputted from the counting circuit in order to generate a multiplexed one signal,
    a demultiplexing circuit for demultiplexing the multiplexed one signal generated by the multiplexing circuit in order to generate a demultiplexed signal,
    an arranging circuit for arranging the demultiplexed signal generated by the demultiplexing circuit, and
    an array controlling circuit for detecting the values of bits which are set at the bottoms of demultiplexed signals generated by demultiplexing multiplexed count values outputted from the multiplexing circuit in order in which the arranging circuit arranges the demultiplexed signals generated by demultiplexing the multiplexed count values, and for changing an array of the demultiplexed signal generated by demultiplexing the multiplexed count value with the demultiplexing circuit on the basis of a change of the detected values of bits which are set at the bottoms of the demultiplexed signals.

2. A multiplexed signal demultiplexing device as claimed in claim 1, further comprising a selecting circuit for outputting one signal selected from the predetermined signal and the count value outputted from the counting circuit, to the multiplexing circuit.

3. A transmission error measuring device comprising:
    a pulse generator for outputting a pulse signal having a predetermined reference frequency,
    a transmitting unit for outputting a predetermined signal to an object to be measured by synchronizing with the pulse signal outputted from the pulse generator, and
    a receiving unit for comparing a signal which is inputted into the object to be measured and is transmitted through the object to be measured, with the predetermined signal to be outputted from the transmitting unit, and for detecting that the signal transmitted through the object to be measured is not coincident with the predetermined signal,
    wherein the transmitting unit comprises;
        a first counting circuit for counting by synchronizing with the pulse signal outputted from the pulse generator, and for outputting a count value obtained by counting with the first counting circuit,
        a predetermined signal output circuit storing a plurality of signals to be outputted as the predetermined signal, which correspond to the count values outputted from the first counting circuit, for outputting the predetermined signal corresponding to the count value when the count value is inputted thereinto,
        a selecting circuit for outputting one signal selected from the predetermined signal outputted from the predetermined signal output circuit and the count value outputted from the first counting circuit, and
        a multiplexing circuit for multiplexing the one signal outputted from the selecting circuit, and for outputting the multiplexed one signal to the object to be measured,
    the receiving unit comprises;
        a demultiplexing circuit for generating a demultiplexed signal by demultiplexing a signal generated by inputting the one signal outputted from the multiplexing circuit into the object to be measured and then by transferring the one signal through the object to be measured,
        an arranging circuit for arranging the demultiplexed signal generated by the demultiplexing circuit, an array controlling circuit for detecting the values of bits which are set at the bottoms of the demultiplexed signals arranged by the arranging circuit in order in which the arranging circuit arranges the demultiplexed signals and for changing an array of the demultiplexed signal arranged by the arranging circuit on the basis of a change of the detected values of bits which are set at the bottoms of the demultiplexed signals, when the count values outputted from the first counting circuit are outputted by the selecting circuit, a second counting circuit for counting by synchronizing with the pulse signal outputted from the pulse generator by using a count value following one which is last outputted from the selecting circuit when an output of the selecting circuit is changed from the count value to the predetermined signal as an initial value in order to output a count value obtained by counting with the second counting circuit, a comparing signal output circuit storing a plurality of signals to be outputted as the predetermined signal, which correspond to the count values outputted from the second counting circuit, for outputting the predetermined signal corresponding to the count value outputted from the second counting circuit as a comparing signal when the count value outputted from the second counting circuit is inputted thereinto, and a detecting circuit for detecting that a signal outputted from the arranging circuit is not coincident with the comparing signal outputted from the comparing signal output circuit by comparing the signal outputted from the arranging circuit with the comparing signal when the predetermined signal is outputted by the selecting circuit.

4. A transmission error measuring method for measuring a bit error of an object to be measured by using a transmission error measuring device which comprises; a pulse generator for outputting a pulse signal having a predetermined reference frequency, a transmitting unit for outputting a predetermined signal to the object to be measured by synchronizing with the pulse signal outputted from the pulse generator, and a receiving unit for comparing a signal which is inputted into the object to be measured and is transmitted through the object to be measured, with the predetermined signal to be outputted from the transmitting unit, and for detecting that the signal transmitted through the object to be measured is not coincident with the predetermined signal; comprising the steps of:

in the transmitting unit, counting by synchronizing with the pulse signal outputted from the pulse generator, and outputting a first count value obtained by counting, storing a plurality of signals to be outputted as the predetermined signal, which correspond to the first count values, and outputting the predetermined signal corresponding to the first count value, which is selected from the plurality of signals, outputting one signal selected from the outputted predetermined signal and the first count value, and multiplexing the outputted one signal, and outputting the multiplexed one signal to the object to be measured, in the receiving unit, generating a demultiplexed signal by demultiplexing a signal generated by inputting the multiplexed one signal outputted from the transmitting unit into the object to be measured and then by transferring the one signal through the object to be measured, arranging the generated demultiplexed signal, detecting the values of bits which are set at the bottoms of the arranged demultiplexed signals in order in which the demultiplexed signals are arranged and changing an array of the arranged demultiplexed signal on the basis of a change of the detected values of bits which are set at the bottoms of the demultiplexed signals, when the first.count values are inputted into the object to be measured, counting by synchronizing with the pulse signal outputted from the pulse generator by using the first count value following one which is last outputted when the one signal outputted from the object to be measured is changed from the first count value to the predetermined signal as an initial value in order to output a second count value, storing a plurality of signals to be outputted as the predetermined signal, which correspond to the second count values, and outputting the predetermined signal corresponding to the second count value as a comparing signal when the second count value is inputted, and detecting that the arranged demultiplexed signal is not coincident with the comparing signal by comparing the arranged demultiplexed signal with the comparing signal when the predetermined signal is inputted into the object to be measured.

5. A transmission error measuring device for measuring a bit error of an object to be measured comprising;

a first counting circuit for counting in order to obtain a first count value, a test data outputting circuit for outputting a test data corresponding to the first count value, a selecting circuit for selecting one signal between the first count value and the test data, a demultiplexing circuit for demultiplexing the selected one signal transmitted through the object to be measured, an arranging circuit for arranging the demultiplexed one signal having a plurality of bits, a data array monitoring circuit for monitoring an array of the first count value arranged by arranging circuit when the first count value is selected by the selecting circuit in order to rearrange the first count value arranged by arranging circuit, a second counting circuit for counting by using an initial value decided on the basis of the first count value rearranged by the arranging circuit in order to obtain a second count value, a reference data outputting circuit for outputting a reference data corresponding to the second count value, and a comparing circuit for comparing the test data rearranged by rearranging the first count value with the reference data outputted from the reference data outputting circuit;

wherein the data array monitoring circuit rearranges the first count value by using a bit set at the bottom thereof.

6. A transmission error measuring device as claimed in claim 5, further comprising, a multiplexing circuit for multiplexing the selected one signal which is a parallel bit signal, in order to transmit the one signal multiplexed thereby through the object to be measured.

7. A transmission error measuring method for measuring a bit error of an object to be measured comprising the steps of;

counting in order to obtain a first count value, outputting a test data corresponding to the first count value, selecting one signal between the first count value and the test data, demultiplexing the selected one signal transmitted through the object to be measured, arranging the demultiplexed one signal having a plurality of bits, monitoring an array of the arranged first count value when the first count value is selected in order to rearrange the arranged first count value, counting by using an initial value decided on the basis of the rearranged first count value in order to obtain a second count value, outputting a reference data corresponding to the second count value, and comparing the test data rearranged by rearranging the first count value with the reference data;

wherein the first count value is rearranged by using a bit set at the bottom thereof.

8. A transmission error measuring method as claimed in claim 7, further comprising a step of multiplexing the selected one signal which is a parallel bit signal, in order to transmit the multiplexed one signal through the object to be measured.

* * * * *